(12) United States Patent
Han et al.

(10) Patent No.: US 11,521,048 B2
(45) Date of Patent: Dec. 6, 2022

(54) WEIGHT MANAGEMENT METHOD AND SYSTEM FOR NEURAL NETWORK PROCESSING, AND NEURAL NETWORK PROCESSOR

(71) Applicant: INSTITUTE OF COMPUTING TECHNOLOGY, Beijing (CN)

(72) Inventors: Yinhe Han, Beijing (CN); Haobo Xu, Beijing (CN); Ying Wang, Beijing (CN)

(73) Assignee: Institute of Computing Technology, Chinese Academy of Sciences, Beijing (CN)

( * ) Notice: Subject to any disclaimer, the term of this patent is extended or adjusted under 35 U.S.C. 154(b) by 606 days.

(21) Appl. No.: 16/495,649

(22) PCT Filed: Mar. 22, 2018

(86) PCT No.: PCT/CN2018/079976
§ 371 (c)(1),
(2) Date: Sep. 19, 2019

(87) PCT Pub. No.: WO2018/171663
PCT Pub. Date: Sep. 27, 2018

(65) Prior Publication Data
US 2020/0019843 A1    Jan. 16, 2020

(30) Foreign Application Priority Data
Mar. 24, 2017   (CN) .......................... 201710182153.6

(51) Int. Cl.
*H04L 9/06*        (2006.01)
*G06N 3/063*       (2006.01)
(Continued)

(52) U.S. Cl.
CPC ........... *G06N 3/063* (2013.01); *H04L 9/0631* (2013.01); *H04L 9/0894* (2013.01); *G06F 17/16* (2013.01);
(Continued)

(58) Field of Classification Search
CPC ....... H04L 9/06; H04L 9/0631; H04L 9/0618; H04L 9/0625; H04L 9/08; H04L 9/0894;
(Continued)

(56) References Cited

U.S. PATENT DOCUMENTS 10,956,584 B1\*  3/2021  Heaton ................. G06F 21/602
2011/0285504 A1\* 11/2011  Puerto .................... G10L 17/18
                                                           340/5.84

(Continued)

FOREIGN PATENT DOCUMENTS

CN        101764687 A     6/2010
CN        103516512 A     1/2014
(Continued)

OTHER PUBLICATIONS

International Search Report issued in corresponding International Application No. PCT/CN2018/0079976 dated Jun. 13, 2018.

*Primary Examiner* — Shaqueal D Wade-Wright
(74) *Attorney, Agent, or Firm* — Morgan, Lewis & Bockius, LLP (57) ABSTRACT

The present invention relates to a weight management method and system for neural network processing. The method includes two stages, i.e., off-chip encryption stage and on-chip decryption stage: encrypting trained neural network weight data in advance, inputting the encrypted weight into a neural network processor chip, and decrypting the weight in real time by a decryption unit inside the neural network processor chip to perform related neural network calculation. The method and system realizes the protection (Continued)

of weight data without affecting the normal operation of a neural network processor.

8 Claims, 3 Drawing Sheets

(51) Int. Cl.
*H04L 9/08* (2006.01)
*G06F 17/16* (2006.01)
*G06N 3/04* (2006.01)
*H04L 9/40* (2022.01)
*G06N 3/02* (2006.01)

(52) U.S. Cl.
CPC ............. *G06N 3/02* (2013.01); *G06N 3/0454* (2013.01); *H04L 63/0428* (2013.01)

(58) Field of Classification Search
CPC ... H04L 63/04; H04L 63/0428; G06F 21/602; G06F 21/62; G06F 17/16; G06N 3/06; G06N 3/063; G06N 3/02; G06N 3/0454; G06N 3/08
See application file for complete search history.

(56) References Cited

U.S. PATENT DOCUMENTS

| | | | |
|---|---|---|---|
| 2014/0047253 A1* | 2/2014 | Kim | G06F 3/162 |
| | | | 713/320 |
| 2016/0026912 A1 | 1/2016 | Falcon et al. | |
| 2016/0352520 A1 | 12/2016 | Schwach et al. | |
| 2018/0046894 A1* | 2/2018 | Yao | G06F 7/483 |
| 2018/0046897 A1* | 2/2018 | Kang | G06N 3/0445 |
| 2019/0130274 A1* | 5/2019 | Guo | G06N 7/00 |

FOREIGN PATENT DOCUMENTS

| | | |
|---|---|---|
| CN | 105930902 A | 9/2016 |
| CN | 106447034 A | 2/2017 |
| CN | 106506141 A | 3/2017 |
| CN | 106529668 A | 3/2017 |
| CN | 106529670 A | 3/2017 |
| CN | 107086910 A | 8/2017 |

* cited by examiner

WEIGHT MANAGEMENT METHOD AND SYSTEM FOR NEURAL NETWORK PROCESSING, AND NEURAL NETWORK PROCESSOR

RELATED APPLICATIONS

This application is the U.S. national stage application of International (PCT) Patent Application Serial No. PCT/CN2018/079976, filed Mar. 22, 2018, which claims the benefit of Chinese Application No. 201710182153.6, filed Mar. 24, 2017. The entire disclosure of each of these applications is hereby incorporated by reference.

TECHNICAL FIELD

The present invention relates to the field of calculation acceleration for hardware neural network models, and in particular to a weight management method and system for neural network processing.

BACKGROUND OF THE PRESENT INVENTION

The deep learning technology has developed rapidly in recent years and has been widely applied in solving advanced abstract cognitive problems, such as image recognition, speech recognition, natural language understanding, weather prediction, gene expression, content recommendation, intelligent robots or the like. Due to its outstanding performance, the deep learning technology has become a research hotspot in academia and industry.

A deep neural network is one of the perceptual models with the highest development level in the field of artificial intelligence (AI). Such a network simulates the neural junction structure of the human brain by establishing a model, and describes data features with layers and by a plurality of transformation stages, which brings a breakthrough in the processing tasks for large-scale data such as images, video and audio. The model structure is an operational model consisting of a large number of nodes through a net interconnection structure, and these nodes are called neurons. The significance of connection between every two nodes represents weight (i.e. weight value) between the two nodes by the connection signal, which corresponds to the memory in the human neural network.

A neural network represents the expression of algorithms, function approximations or logic strategies applied in a certain scene. For a particular neural network, the connectionship between neurons is fixed, and weight values need to be trained from mass data by application developers. Training weights is a technical task, since, on one hand, training weight values needs to depend upon a large amount of data sources; however, the scientific and effective data, as an important guarantee for supporting scientific researches and scientific applications, is acquired only by specialized persons through observation, simulation, experiments, retrieval or other methods and thus has an extremely high economic value and practical significance, which is an important constituent of the intellectual property, so that the weight values trained on basis of data sources also have intellectual property attributes and need to be protected; and on the other hand, the application developers need to apply correct training methods in order to obtain accurate weight values from a large amount of data, which will take lots of effort and energy and is an important stage in the deep neural network technology.

As a hardware acceleration way for neural network operation, a neural network processor can perform operation processing on the neural network model. However, at present, existing neural network processors have no effective protection mechanisms for the weight security problem mentioned above, so there are problems such as weight value leakage and flood propagation in the prior art.

SUMMARY OF THE PRESENT INVENTION

In view of the defects of the neural network processor, the present invention provides a novel weight management method and system for neural network processing, which ensures the security of weights and the intellectual property of original data during neural network processing.

The objective of the present invention is achieved by the following technical solutions.

In one aspect, the present invention provides a weight management method for neural network processing, including steps of:

encrypting trained original weight data used for neural network processing to generate encrypted weight data;

loading the generated encrypted weight data into a neural network processor; and decrypting, by the neural network processor in response to an instruction to execute calculation, the received encrypted weight data and executing a related neural network operation based on the decrypted weight data.

The method may further include: storing the decrypted weight data by the neural network processor.

In the method, the original weight data may be encrypted by an AES encryption algorithm.

In the method, the encrypting the original weight data may include:

step S11: splicing, in a data recoding manner, the original weight data to be encrypted into a 128-bit data bit width or a user-specified weight bit width as weight plaintext, loading an initial key, and processing the initial key according to a key expansion algorithm to generate sub-keys for each round of encryption;

step S12: performing ByteSub transformation, ShiftRow transformation and MixColumn transformation on the weight plaintext, and then performing a bitwise XOR operation on the weight plaintext and the corresponding sub-key to complete a round of encryption; and step S13: cyclically performing the step S12 for a total of ten times, and using a result of encryption generated after ten rounds of encryption as the encrypted weight data.

In the method, the decrypting the received encrypted weight data may include:

step S21: performing a bitwise XOR operation on the encrypted weight data and the sub-key used in the final round of the encryption algorithm, and transmitting a result of operation to step S22;

step S22: performing inverse ShiftRow transformation and inverse ByteSub transformation on the result of operation, and performing inverse MixColumn transformation on the result of operation and the corresponding sub-key used in the encryption method to complete a round of decryption; and step S23: cyclically performing the step S22 for a total of ten times, using a result of decryption generated after ten rounds of decryption as the weight plaintext, and decoding the weight plaintext to obtain the original weight data, wherein the sub-keys used in the tenth to first rounds of the encryption process are successively used in each round of decryption.

The method may further include: determining whether the buffer is full, and if yes, stopping decryption.

In the method, the neural network operation may include vector multiplication/addition, pooling and normalization calculation.

In another aspect, the present invention provides a weight management method for neural network processing, including steps of:

step S1: encrypting trained original weight data by an encryption algorithm to generate encrypted weight data, and transmitting the encrypted weight data and an original key matched with the encrypted weight data to step S2;

step S2: reading the original key, decrypting the encrypted weight data according to a corresponding decryption algorithm to generate original weight data, and transmitting the original weight data to step S4;

step S3: reading an instruction to be executed, parsing the instruction to obtain a storage address, and acquiring input data from the storage address; and step S4: receiving the input data and the original weight data, executing a neural network operation according to the instruction, and outputting a result of operation.

In still another aspect, the present invention further provides a neural network processor system, including an input data storage unit, a control unit, a weight storage unit, a calculation unit, a decryption unit, a key storage unit and a secure weight buffer;

wherein the weight storage unit is configured to store weight data that has been trained and encrypted, and the weight storage unit has only one output which is connected to the decryption unit; the key storage unit stores keys associated with the encrypted weight data, and the key storage unit has only one output which is connected to the decryption unit; the decryption unit is configured to decrypt, in response to an instruction from the control unit and by using a key acquired from the key storage unit, the encrypted weight data acquired from the weight storage unit to generate original weight data, and an output of the decryption unit is connected to the secure weight buffer; and the secure weight buffer is configured to store the weight data from the decryption unit; and wherein the calculation unit executes a related neural network operation in response to an instruction from the control unit and based on neural network data acquired from the input data storage unit and weight data acquired from the secure weight buffer.

In yet another aspect, the present invention further provides a weight management system for neural network processing, including:

an encryption module configured to encrypt trained original weight data according to an encryption algorithm to generate encrypted weight data and transmit the encrypted weight data and original keys matched with the encrypted weight data to a decryption module;

the decryption module configured to read the original keys, decrypt the encrypted weight data according to a decryption algorithm to generate original weight data and transmit the original weight data to an operation unit;

a control module configured to fetch an instruction to be executed, decode the instruction to obtain a storage address, and obtain input data from the storage address; and the operation module configured to receive the input data and the original weight data, execute a neural network operation according to the instruction and output a result of operation.

Compared with the prior art, the present invention has the following advantages: The trained neural network weight data is processed by off-chip encryption and on-chip real-time decryption; the weight data is encrypted by an off-chip encryption system, and the encrypted weight is decrypted by an on-chip decryption unit, thus the weight data is protected without affecting the normal neural network operation.

BRIEF DESCRIPTION OF THE DRAWINGS

The embodiments of the present invention will be further described below with reference to the accompanying drawings, in which.

DETAILED DESCRIPTION OF THE PRESENT INVENTION

To make the objectives, technical solutions and advantages of the present invention clearer, the present invention will be further described below in detail by specific embodiments with reference to the accompanying drawings. It should be understood that the specific embodiments described herein are merely for explaining the present invention, rather than limiting the present invention.

Figure 1:
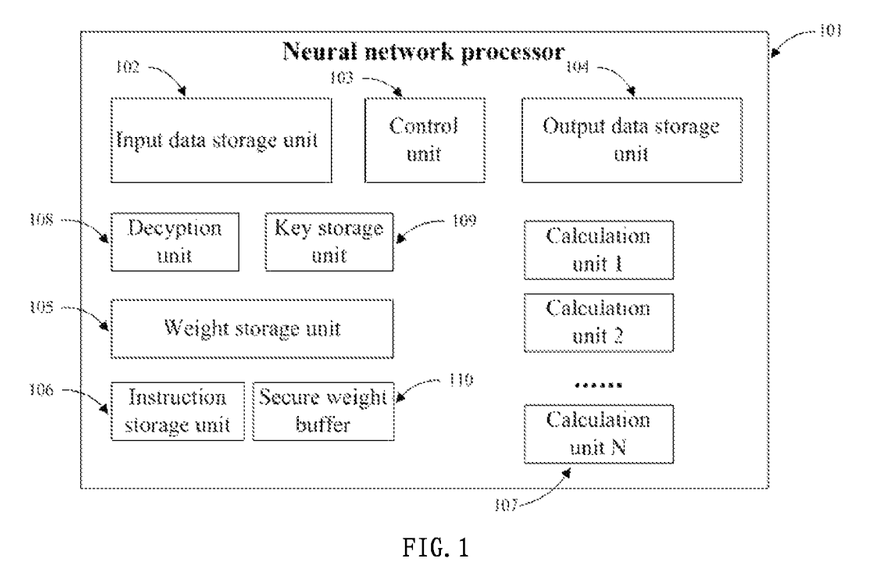
FIG. 1 is a schematic diagram of a neural network processing system with a weight decryption function according to an embodiment of the present invention.

FIG. 1 is a schematic structural diagram of a neural network processor system with a weight decryption function according to an embodiment of the present invention. The neural network processor system 101 includes at least one input data storage unit 102, at least one control unit 103 (control module), at least one output data storage unit 104, at least one weight storage unit 105, at least one instruction storage unit 106, at least one calculation unit 107 (operation module), at least one decryption unit 108 (decryption module), at least one key storage unit 109 and at least one secure weight buffer 110. The input data storage unit 102 is connected to the calculation unit 107 and configured to store calculation data participating in calculation, and these data includes original feature map data and data participating in the calculation of intermediate layers. The output data storage unit 104 is connected to the calculation unit 107 and configured to store neuron response values calculated by the calculation unit. The instruction storage unit 106 is configured to store operating instructions and operational data participating in calculation, and these operating instructions are parsed to control streams for scheduling the calculation of the neural network.

In this embodiment, the weight storage unit 105 is configured to store neural network weights that have been obtained through training and encrypted, i.e., encrypted weight data. The weight data can be encrypted in advance by an encryption device outside the neural network processor, that is, the weight data is off-chip encrypted. In addition, the weight data can be encrypted with various encryption methods. For ease of description, the specific processing process of the weight management for the neural network processor will be described hereinafter by taking an Advanced Encryption Standard (AES) of the SP network as an example. It is to be noted that, during the application of the AES algorithm in the weight management process, the network features, calculation characteristics and the requirements for high throughput of the neural network need to be taken into consideration. In this embodiment of the present invention, several ways are to be used to reduce the internal data bandwidth requirements and improve the throughput, such as weight splicing and recoding, encrypted data caching, data sharing etc.. For example, the data bit width of the AES algorithm usually is 128 bits, while the weight data bit width in the neural network model usually is 32 bits, 16 bits, 8 bits or the like. In an embodiment, during the off-chip encryption, the weight data can be spliced into the data bit width (e.g., 128 bits) of the encryption algorithm (e.g., the AES algorithm) to be used according to the data bit width of the encryption algorithm, and then encrypted. Similarly, during the on-chip decryption, the weight data spliced into 128 bits can be restored to the original bit width of the weight data. The weight bit width may be specified by a user, or may be set based on the hardware of the neural processor for processing the weight data.

For example, the process of encrypting the weight data obtained through train (in short, trained weight data) by the AES algorithm may include the following steps.

Step 11: The original trained weight data to be encrypted is spliced according to the data bit width required by the AES to obtain weight plaintext (here, taking 128 bits as example), an original key is loaded, and the original key is processed according to a key expansion algorithm of the AES to generate sub-keys required by each round of encryption (sub-keys for ten rounds of encryption). That is, the key for each round of encryption is expanded from the original key.

Step 12: ByteSub transformation, ShiftRow transformation and MixColumn transformation are performed on the weight plaintext, and a bitwise XOR operation is performed on the weight plaintext and the corresponding sub-key to complete a round of encryption.

Step 13: The step S12 is cyclically performed for a total of ten times, and a result of encryption generated after ten rounds of encryption is used as the encrypted weight data.

It is to be noted that the "corresponding sub-key" in the step S12 means that during the first round of encryption, the bitwise XOR operation is performed on the original trained weight data by using the first sub-key; during the second round of encryption, the bitwise XOR operation is performed on the result of encryption generated after the first round of encryption by using the second sub-key; during the third round of encryption, the bitwise XOR operation is performed on the result of encryption generated after the second round of encryption by using the third sub-key; and similarly, during the tenth round of encryption, the bitwise XOR operation is performed on the result of encryption generated after the ninth round of encryption by using the tenth sub-key.

Correspondingly, for example, the process of decrypting the weight data obtained in the encryption process may include the following steps:

Step 41: A bitwise XOR operation is performed on the encrypted weight data and the sub-key used in the last round of the encryption algorithm, and a result of operation is transmitted to step S42.

Step 42: Inverse ShiftRow transformation and inverse ByteSub transformation are performed on the result of operation, and inverse MixColumn transformation is performed on the result of operation and the corresponding sub-key used in the encryption method to complete a round of decryption.

Step 43: The step S42 is cyclically performed for a total of ten times, a result of decryption generated after ten rounds of decryption is used as the weight plaintext, and the decrypted weight plaintext is split according to the original weight bit width to obtain original trained weight data, wherein the sub-keys used in the tenth to first rounds of the encryption process are successively used in each round of decryption.

The decryption process can be executed by the decryption unit 108 in FIG. 1. In an embodiment of the present invention, for the security of the weight data, the weight storage unit in the neural network processor unit has only one output which is connected to the decryption unit 108, and the decryption unit 108 is configured to acquire the encrypted weight data from the weight storage unit, acquire the corresponding keys from the key storage unit 109 and decrypt the encrypted weight data to obtain original weight data. The keys associated with the encrypted weight data can be stored in the key storage unit 109. In this embodiment, the key storage unit 109 has only one output which is connected to the decryption unit 108. Generally, a non-volatile storage unit is used as the key storage unit, and there are two different types of non-volatile storage units, a multiple-write type and a single-write type. Specifically, the key storage unit may be a non-volatile storage unit with single-write or multiple-write ability, and storage units of the same type are used in the same circuit. For example, a single-write non-volatile storage unit can be used to store the original key, and the user can only read rather than altering the information about the original key, so that the security is high but the flexibility is insufficient. If a multiple-write non-volatile storage unit is used to store the original key, the user can alter the information about the original key as required. For example, the key storage unit can be a non-volatile storage unit memory using eFuse, which can only be written for a single time, and its output signal is only transmitted to the decryption unit.

In this embodiment, in order that the decryption process does not affect the calculation efficiency of the neural network, a secure weight buffer 110 is further provided between the decryption unit and the calculation unit. The secure weight buffer 110 is configured to receive and store the weight data that is decrypted and output by the decryption unit 108, for further use in the calculation unit. In this way, the decrypted weight value can be reused, and stored on chip, thus further implementing the rate matching between the production and consumption of the weight data.

Continuously referring to FIG. 1, the control unit 103 is connected to the output data storage unit 104, the weight storage unit 105, the instruction storage unit 106, the calculation unit 107, the decryption unit 108 and the key storage unit 109, respectively. The control unit 103 acquires an operating instruction stored in the instruction storage unit 106, and parses the operating instruction to control the calculation unit 107. The control unit 103 may also control, according to the control signal obtained by parsing the operating instruction, the calculation unit 107 to perform corresponding neural network calculation. For example, the neural network calculation may include vector multiplication/addition, pooling and normalization calculation.

In this embodiment, the calculation unit 107 is connected to the control unit 103, the input data unit 102, the secure weight buffer 110 and the output data storage unit 104, and configured to execute, according the control signal generated by the control unit 103, corresponding neural network calculation to generate a neuron response value. The calculation unit 107 can acquire data from the input data storage unit 102 and acquire a corresponding weight from the secure weight buffer 110 to perform related neural network calculation, and can write data (for example, the intermediate result and the final result of the neural network calculation) into the output data storage unit 104. Actually, the calculation unit 107 in the neural network processor is usually a dedicated calculation module specifically designed for the neural network and configured to complete most of operations in the algorithm of the neural network, for example, vector multiplication/addition, pooling, corresponding local normalization or other operations. Preferably, the neural network processor can adopt a layer depth calculation mode by reusing the data of layers, to improve the data utilization.

Figure 2:
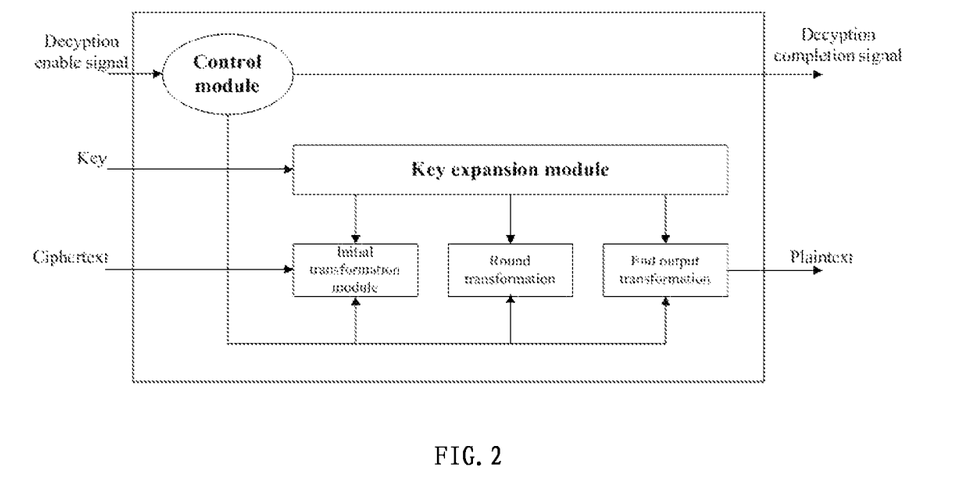
FIG. 2 is a schematic structural diagram of a decryption unit according to an embodiment of the present invention.

FIG. 2 shows a schematic structural diagram of the decryption unit according to an embodiment of the present invention. As shown in FIG. 2, the decryption unit may include a control module, a key expansion module, an initial transformation module, a round transformation module, an end output transformation module, input and output interfaces or the like. The input interface may include a decryption enable interface, a key interface and a ciphertext input interface, which receive a decryption enable signal, a key and ciphertext, respectively. The input interface may include a plaintext output interface configured to output the decrypted plaintext, and a decryption completion interface configured to output a decryption completion signal.

As shown in FIG. 2, the decryption enable interface is connected to the control unit, and configured to receive and transmit the decryption enable signal to the control module in the decryption unit. The decryption enable signal serves as an enable signal for the decryption unit to start operation, and when the signal is set at a high level, the decryption unit (decryption circuit) starts operating. The key interface is connected to the key storage unit for receiving the original key. When the original key enters into the decryption unit, it is first input into the key expansion module, and then the key after expansion is input into each transformation module to decrypt the ciphertext (encrypted weight data) into plaintext. The input ciphertext interface is configured to receive the encrypted weight data (ciphertext) and is connected to the weight storage unit. As an interface for outputting the result of decryption, the output plaintext interface is configured to output the decrypted weight data, which is connected to the secure weight buffer. The decryption completion interface is also connected to the secure weight buffer for outputting the decryption completion signal to the secure weight buffer.

Continuously referring to FIG. 2, the control module in the decryption unit is configured to schedule and control the operation sequences and the enable signal of each module in the decryption unit. The decryption enable signal serves as an enable signal for the control module to start the whole decryption process. The decryption completion signal is set low when the decryption is completed, indicating an end of the decryption process. According to the original key received, the key expansion module generates, by using a key expansion algorithm, sub-keys required for each round of transformation in the cipher round transformation. The sequence of generating the decryption sub-keys is the reverse of that of generating the encryption keys. The initial transformation module performs a preprocessing operation on the input ciphertext data (encrypted weight data), which includes an operation of performing matrix arrangement processing on the encrypted weight data, a bitwise XOR operation on the corresponding sub-key and the ciphertext data, or the like. The round transformation module performs the remaining decryption operations according to the sub-keys generated by the key expansion module, for example, inverse ShiftRow transformation, inverse byte transformation, round key addition, inverse MixColumn or the like. The end output module performs inverse column shift transformation, inverse byte transformation, round key addition or other operations, and outputs the final plaintext data to complete the decryption.

Figure 3:
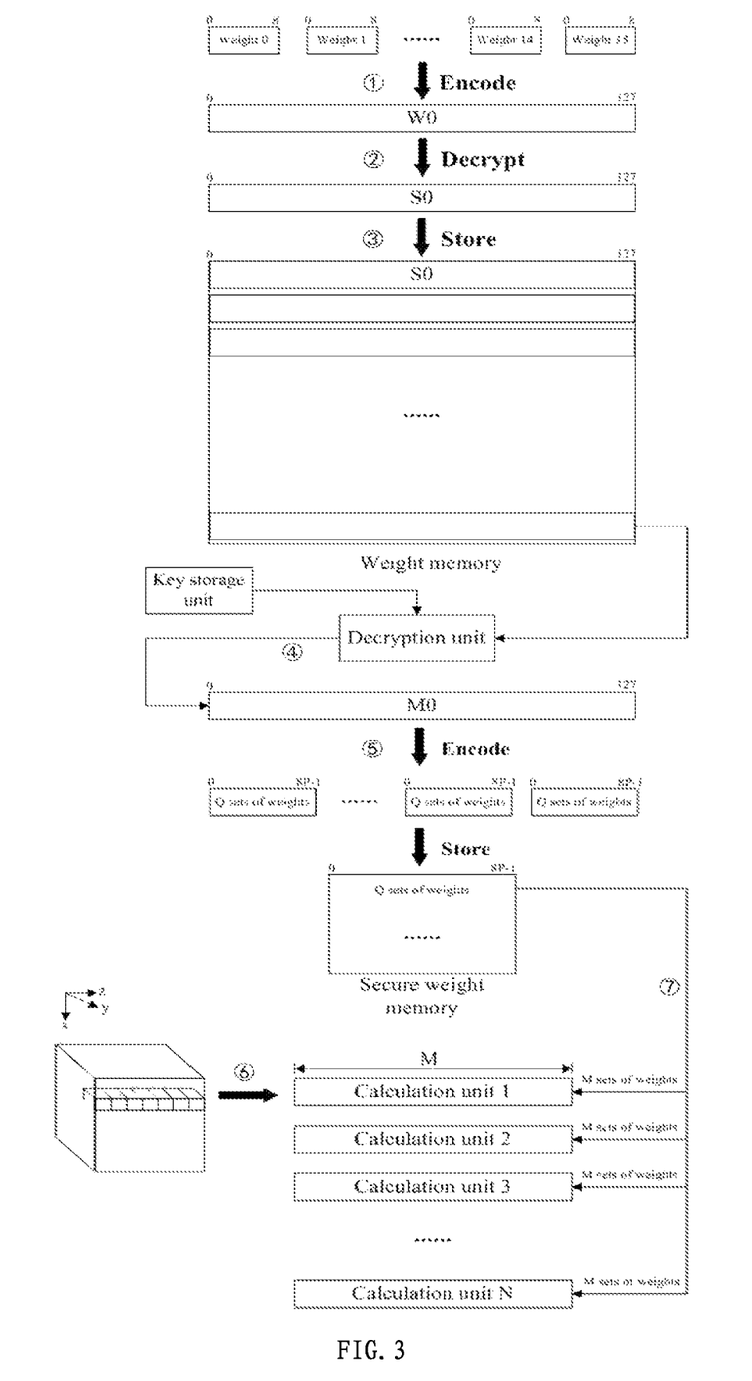
FIG. 3 is a schematic diagram of a weight management process for neural network processing according to an embodiment of the present invention.

FIG. 3 is a schematic diagram of a weight management process for the neural network processor system by taking an 8-bit weight as an example. As shown in FIG. 3, it is assumed that the number of bits of the weight used in the neural network calculation is 8; the length of a set of plaintext or ciphertext in the AES encryption/decryption algorithm adopted is 128 bits, so a set of plaintext can be loaded with 16 weight values; and, the calculation unit has a depth of M and a width of N. The weight processing process of the off-chip encryption and on-chip decryption for the neural network process described above may include the following steps.

Step 1': The trained original weight data is recoded to splice the 8-bit weight data into 128-bit data W0.

Step 2': The data W0 is encrypted by an AES algorithm to obtain ciphertext data (encrypted weight data) S0.

Step 3': The ciphertext data S0 is transmitted to the weight storage unit in the neural network processor, and keys are stored in the key storage unit at the same time.

Step 4': The decryption enable signal of the decryption unit is set high by the control unit, and the decryption unit acquires the ciphertext data S0 from the weight storage unit and decrypts the ciphertext data S0 to obtain decrypted plaintext (original weight data) M0.

Step 5': The decrypted plaintext M0 is recoded into 8P-bit weight data by the decryption unit, and the 8P-bit weight data is stored into the secure buffer; once the secure weight buffer is full or the required weight has been transmitted, the decryption enable signal is set low, and the decryption unit stops decryption; and, when the weight bit width is 8 bits, P is 1.

Step 6': matrix M*N of data are loaded into the calculation unit.

Step 7': M*N weight values are loaded into the calculation unit to perform an operation of a convolutional neural network. In this embodiment, the convolutional operation is performed by adopting a layer depth calculation method. That is, data with the same x-axis and y-axis but different z-axis is calculated simultaneously. Therefore, it is necessary to load the weight data repetitively.

Step 8': After a set of layers has been calculated, the decryption enable signal is set high, and the steps 5' to 7' are repeated until the neural network calculation ends.

In this example, the layer depth calculation mode is employed, in which the number M of calculation units is an integral multiple of 4, and P may be 16, 8, 4, 2, 1 or the like. When P is greater than M, P sets of weight values with the same address are split into M sets of weight values and are input into different calculation units; when P is equal to M, P sets of weight values are directly input to the calculation units; and, when P is less than M, weight values with different addresses are spliced into M sets of weight values which are input into the calculation units as data blocks.

In another embodiment of the present invention, a weight management method for neural network processing is provided, which includes two stages, i.e., off-chip encryption stage and on-chip decryption stage. Trained neural network weight data is encrypted in advance to avoid weight leakage. Then, the encrypted weight is input into a neural network processor chip, and the weight data is decrypted in real time by the neural network processor through an internal decryption unit. More specifically, the method includes the following steps.

Step S1: Trained original weight data is encrypted by an encryption algorithm to generate encrypted weight data, and the encrypted weight data and original keys matched with the encrypted weight data are transmitted to step S2.

Step S2: The original keys are read, which are used to decrypt the encrypted weight data according to the corresponding decryption algorithm to generate original weight data, and the original weight data is transmitted to step S4.

Step S3: An instruction to be executed is fetched, the instruction is decoded to obtain a storage address, from which input data is obtained.

Step S4: The input data and the original weight data are received, on which a neural network operation is executed according to the instruction, and a result of operation is output.

In the step S1, encrypting trained original weight data by an encryption algorithm includes:

Step S11: with a data recoding manner, the original weight data to be encrypted is spliced into for example a 128-bit data bit width or a user-specified weight bit width as weight plaintext, an original key is also loaded, and the original key is processed according to a key expansion algorithm to generate sub-keys required for each round of encryption.

Step S12: ByteSub transformation, ShiftRow transformation and MixColumn transformation are performed on the weight plaintext, and then a bitwise XOR operation is performed on the weight plaintext and the corresponding sub-key to complete a round of encryption.

Step S13: The step S12 is cyclically performed for a total of ten times, and a result of encryption generated after ten rounds of encryption is used as the encrypted weight data.

In the step S2, decrypting the encrypted weight data according to a corresponding decryption algorithm includes the following steps.

Step S21: A bitwise XOR operation is performed on the encrypted weight data and the sub-key used in the final round of the encryption algorithm, and a result of operation is transmitted to step S22.

Step S22: Inverse ShiftRow transformation and inverse ByteSub transformation are performed on the result of operation, and inverse MixColumn transformation is performed on the result of operation and the corresponding sub-key used in the encryption method to complete a round of decryption.

Step S23: The step S22 is cyclically performed for a total of ten times, after that, a result of decryption is used as the weight plaintext, and the weight plaintext is decoded to obtain the original weight data, wherein the sub-keys used in the tenth to first rounds of the encryption process are successively used in each round of decryption.

In some embodiments, the weight management method for neural network processing further includes: storing the original weight data generated in the step S2, and stopping decryption if the buffer is full. In some embodiments, the neural network operation includes vector multiplication/addition, pooling and normalization calculation.

Figure 4:
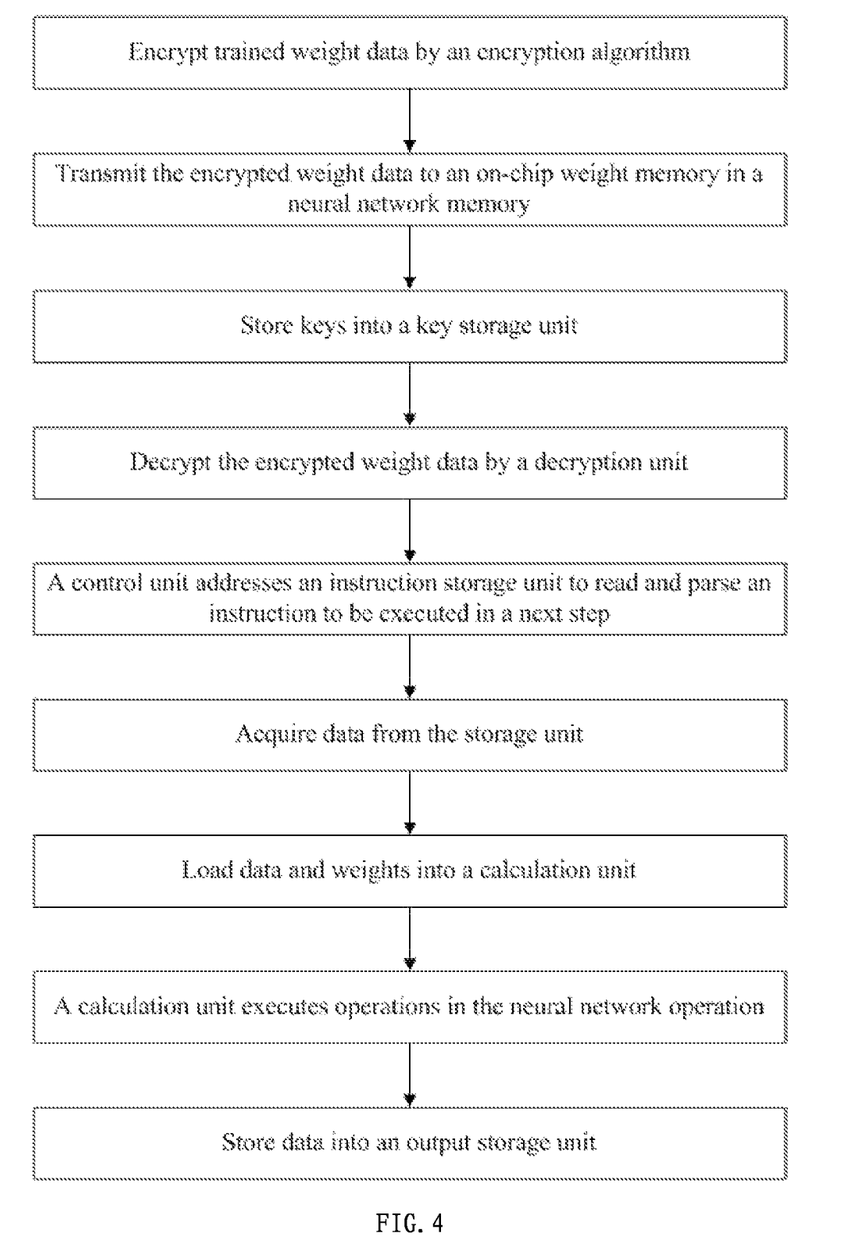
FIG. 4 is a schematic flowchart of a weight management method for neural network processing according to an embodiment of the present invention.

FIG. 4 depicts a schematic flowchart of a weight management method for a neural network processor according to another embodiment of the present invention. The method includes the following steps.

Step (1): Trained original weight data is encrypted by an encryption algorithm to generate encrypted weight data and original keys matched with the encrypted weight data, and the encrypted weight data and the keys are stored in a memory outside the system.

Step (2): The encrypted weight data is transmitted to a weight storage unit in a neural network processor system.

Step (3): The original keys are stored into a key storage unit in the neural network processor system.

Step (4): A decryption unit is scheduled by a control unit to read the original key, decrypt the encrypted weight data according to a decryption algorithm to obtain original weight data and store the original weight data into a secure buffer.

Step (5): The control unit addresses an instruction storage unit to fetch an instruction to be executed in a next step, and decodes the instruction to obtain a storage address.

Step (6): Input data is acquired from an input data storage unit according to the storage address.

Step (7): The input data and the original weight data are loaded into a calculation unit from the input storage unit and the secure buffer, respectively.

Step (8): The calculation unit executes an operation in the neural network operation and outputs a result of operation to an output data storage unit.

In still another embodiment, the present invention further provides a weight management system for neural network processing, including the following modules:

an encryption module configured to encrypt trained original weight data according to an encryption algorithm to generate encrypted weight data and transmit the encrypted weight data and original keys matched with the encrypted weight data to a decryption module;

the decryption module configured to read the original keys, decrypt the encrypted weight data according to a decryption algorithm to generate original weight data and transmit the original weight data to an operation module;

a control module configured to fetch an instruction to be executed, decode the instruction to obtain a storage address and obtain input data from the storage address; and the operation module configured to receive the input data and the original weight data, execute a neural network operation according to the instruction and output a result of operation.

In some embodiments, the encryption module may include a coding module, a first transformation module and a first circulation module, wherein the coding module is configured to recode the original weight data, for example, to splice the original weight data to be encrypted into a 128-bit data bit width or a user-specified weight bit width as weight plaintext; and, load an original key and process the original key according to a key expansion algorithm to generate sub-keys required for each round of encryption; The first transformation module is configured to perform ByteSub transformation, ShiftRow transformation and MixColumn transformation on the weight plaintext, and perform a bitwise XOR operation on the weight plaintext and the corresponding sub-key to complete a round of encryption; and the first circulation module is configured to cyclically invoke the first transformation module for a total of ten times and use a result of encryption generated after ten rounds of encryption as the encrypted weight data.

In some embodiments, the decryption module may include an XOR module, a second transformation module and a second circulation module, wherein the XOR module is configured to perform a bitwise XOR operation on the encrypted weight data and the sub-key used in the final round of the encryption algorithm and transmit a result of operation to the second transformation module; the second transformation module is configured to perform inverse ShiftRow transformation and inverse ByteSub transformation on the result of operation, and perform inverse MixColumn transformation on the result of operation and the corresponding sub-key used in the encryption method to complete a round of decryption; and the second circulation module is configured to cyclically invoke the second transformation module for a total of ten times, use a result of decryption generated after ten rounds of decryption as the weight plaintext, and decode the weight plaintext to obtain the original weight data, wherein the sub-keys used in the tenth to first rounds of the encryption process are successively used in each round of decryption.

In yet another embodiment, the weight management system for neural network processing may further include a secure weight buffer for storing the original weight data generated by the decryption module and stopping decryption if the cache is full.

It can be observed from the embodiments of the present invention that, in the weight management method and system for neural network processing provided by the present invention, weight data is encrypted by an off-chip encryption system, and the encrypted weight is decrypted by an on-chip decryption unit, so that the weight data is protected without affecting the normal operation of the neural network processor.

References to "various embodiments", "some embodiments", "an embodiment", "embodiments" or the like in this specification mean that the particular features, structures or properties described with reference to the embodiment/embodiments are included in at least one embodiment. Therefore, the use of the phase "in various embodiments", "in some embodiments", "in an embodiment", "in embodiments" or the like at various locations in this specification does not necessarily refer to a same embodiment. In addition, particular features, structures or properties may be combined in one or more embodiments in any suitable way. Therefore, the particular features, structure or properties shown or described in one embodiment may be integrally or partially combined with the features, structures or properties in one or more other embodiments without restrictions, unless such combination is not logical or does not work. In addition, the elements in the accompanying drawings of the present application are merely illustrative and are not drawn to scale.

Several aspects of at least one embodiment of the present invention have been described above. It should be understood that various alterations, modifications and improvements are easily conceived by those skilled in the art. These alterations, modifications and improvements are intended to be within the spirit and scope of the present invention.

The invention claimed is:

1. A weight management method for neural network processing, comprising steps of:
  encrypting trained original weight data used for neural network processing to generate encrypted weight data;
  loading the generated encrypted weight data into a neural network processor; and
  decrypting, by the neural network processor in response to an instruction to execute calculation, the received encrypted weight data and executing a related neural network operation based on the decrypted weight data, wherein the original weight data is encrypted by an AES encryption algorithm, and encrypting the original weight data comprises:
    step S11: splicing, in a data recoding manner, the original weight data to be encrypted into a 128-bit data bit width or a user-specified weight bit width as weight plaintext, loading an initial key, and processing the initial key according to a key expansion algorithm to generate sub-keys for each round of encryption;
    step S12: performing ByteSub transformation, ShiftRow transformation and MixColumn transformation on the weight plaintext, and performing a bitwise XOR operation on the weight plaintext and the corresponding sub-key to complete a round of encryption; and
    step S13: cyclically performing the step S12 for a total of ten times, and using a result of encryption generated after ten rounds of encryption as the encrypted weight data.

2. The method according to claim 1, further comprising: storing the decrypted weight data by the neural network processor.

3. The method according to claim 1, wherein decrypting the received encrypted weight data comprises:
  step S21: performing a bitwise XOR operation on the encrypted weight data and the sub-key used in the final round of the encryption algorithm, and transmitting a result of operation to step S22;
  step S22: performing inverse ShiftRow transformation and inverse ByteSub transformation on the result of operation, and performing inverse MixColumn transformation on the result of operation and the corresponding sub-key used in the encryption method to complete a round of decryption; and
  step S23: cyclically performing the step S22 for a total of ten times, using a result of decryption generated after ten rounds of decryption as the weight plaintext, and decoding the weight plaintext to obtain the original weight data, wherein the sub-keys used in the tenth to first rounds of the encryption process are successively used in each round of decryption.

4. The method according to claim 2, further comprising: determining whether the buffer is full, and if yes, stopping decryption.

5. The method according to claim 1, wherein the neural network operation comprises vector multiplication/addition, pooling and normalization calculation.

6. A neural network processor system, comprising an input data storage unit, a control unit, a weight storage unit, a calculation unit, a decryption circuit, a key storage unit and a secure weight buffer;
  wherein the weight storage unit is configured to store weight data that has been trained and encrypted, and the weight storage unit has only one output which is connected to the decryption circuit; the key storage unit stores keys associated with the encrypted weight data, and the key storage unit has only one output which is connected to the decryption circuit; the decryption circuit is configured to decrypt, in response to an instruction from the control unit and by using a key acquired from the key storage unit, the encrypted weight data acquired from the weight storage unit to generate original weight data, and an output of the decryption circuit is connected to the secure weight buffer; and the secure weight buffer is configured to store the weight data from the decryption unit; and wherein the weight storage unit and the key storage unit are non-volatile storage units; and
  wherein the calculation unit executes a related neural network operation in response to an instruction from the control unit and based on neural network data acquired from the input data storage unit and weight data acquired from the secure weight buffer; and wherein the weight data is encrypted by:

step S11: splicing, in a data recoding manner, the original weight data to be encrypted into a 128-bit data bit width or a user-specified weight bit width as weight plaintext, loading an initial key, and processing the initial key according to a key expansion algorithm to generate sub-keys for each round of encryption;

step S12: performing ByteSub transformation, Shift-Row transformation and MixColumn transformation on the weight plaintext, and performing a bitwise XOR operation on the weight plaintext and the corresponding sub-key to complete a round of encryption; and step S13: cyclically performing the step S12 for a total of ten times, and using a result of encryption generated after ten rounds of encryption as the encrypted weight data.

7. A weight management method for neural network processing, comprising steps of:

step S1: encrypting trained original weight data by an encryption algorithm to generate encrypted weight data, and transmitting the encrypted weight data and original keys matched with the encrypted weight data to step S2;

step S2: reading the original keys, decrypting the encrypted weight data according to a corresponding decryption algorithm to generate original weight data, and transmitting the original weight data to step S4;

step S3: fetching an instruction to be executed, decoding the instruction to obtain a storage address, and obtaining input data from the storage address; and step S4: receiving the input data and the original weight data, executing a neural network operation according to the instruction, and outputting a result of operation, wherein the encrypting trained original weight data by an encryption algorithm comprises:

step S11: splicing, in a data recoding manner, the original weight data to be encrypted into a 128-bit data bit width or a user-specified weight bit width as weight plaintext, loading an initial key, and processing the initial key according to a key expansion algorithm to generate sub-keys for each round of encryption;

step S12: performing ByteSub transformation, Shift-Row transformation and MixColumn transformation on the weight plaintext, and performing a bitwise XOR operation on the weight plaintext and the corresponding sub-key to complete a round of encryption; and step S13: cyclically performing the step S12 for a total of ten times, and using a result of encryption generated after ten rounds of encryption as the encrypted weight data.

8. A weight management system for neural network processing, comprising:

an encryption module configured to encrypt trained original weight data according to an encryption algorithm to generate encrypted weight data and transmit the encrypted weight data and original keys matched with the encrypted weight data to a decryption module;

the decryption module configured to read the original keys, decrypt the encrypted weight data according to a decryption algorithm to generate original weight data and transmit the original weight data to an operation unit;

a control module configured to fetch an instruction to be executed, decode the instruction to obtain a storage address, and obtain input data from the storage address; and an operation module configured to receive the input data and the original weight data, execute a neural network operation according to the instruction and output a result of operation, wherein the encrypting trained original weight data according to an encryption algorithm comprises:

step S11: splicing, in a data recoding manner, the original weight data to be encrypted into a 128-bit data bit width or a user-specified weight bit width as weight plaintext, loading an initial key, and processing the initial key according to a key expansion algorithm to generate sub-keys for each round of encryption;

step S12: performing ByteSub transformation, Shift-Row transformation and MixColumn transformation on the weight plaintext, and performing a bitwise XOR operation on the weight plaintext and the corresponding sub-key to complete a round of encryption; and step S13: cyclically performing the step S12 for a total of ten times, and using a result of encryption generated after ten rounds of encryption as the encrypted weight data.

\* \* \* \* \*